United States Patent [19]
Lanting et al.

[11] Patent Number: 5,916,608
[45] Date of Patent: *Jun. 29, 1999

[54] DAIRY BASED SPREAD AND PROCESS OF MAKING

[75] Inventors: Feico Lanting, Senden; Albert Johann Biggel, Kempten; Freek Reckweg, Buchenberg-Ahegg, all of Germany

[73] Assignee: Van den Bergh Foods Company, Division of Conopco, Inc., Lisle, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/686,791

[22] Filed: Jul. 26, 1996

[30] Foreign Application Priority Data

Jul. 27, 1995 [EP] European Pat. Off. .............. 95202059
Sep. 8, 1995 [EP] European Pat. Off. .............. 95202447

[51] Int. Cl.⁶ .............................. A23C 15/06; A23C 23/00
[52] U.S. Cl. .............................. 426/34; 426/41; 426/576; 426/583; 426/603
[58] Field of Search .................... 426/34, 41, 576, 426/583, 603

[56] References Cited

U.S. PATENT DOCUMENTS 1,605,009 11/1926 Spaeth .
3,982,039 9/1976 Scibelli et al. ......................... 426/603
4,177,293 12/1979 Forman et al. .
4,569,846 2/1986 Ohzeki et al. .
4,772,483 9/1988 Nolte .
5,372,825 12/1994 Campbell et al. ......................... 426/41

FOREIGN PATENT DOCUMENTS

| 283101 | 9/1988 | European Pat. Off. . |
| 340857 | 11/1989 | European Pat. Off. . |
| 483896 | 5/1992 | European Pat. Off. . |
| 540085 | 5/1993 | European Pat. Off. . |
| 540087 | 5/1993 | European Pat. Off. . |
| 2014742 | 4/1970 | France . |
| 2300663 | 7/1974 | Germany . |
| 3324821 | 1/1985 | Germany . |
| 574389 | 1/1946 | United Kingdom . |
| 1261910 | 1/1972 | United Kingdom . |
| 93/17565 | 9/1993 | WIPO . |
| 96/03888 | 2/1996 | WIPO . |

*Primary Examiner*—Helen Pratt
*Attorney, Agent, or Firm*—Matthew Boxer

[57] ABSTRACT

Creamy, cultured dairy based water continuous spread comprising less than 35% fat, up to 4.5% milk protein, gelatin or a gelatin replacer, optionally up to 2% structuring agent, the spread having a pH value between 4.6 and 5.2, and a Stevens value hardness at 10° C. of 200–500 g and of 50–250 g at 20° C., a whey protein to casein weight ratio higher than in milk, and the spread having a butter-like mouthfeel, texture and taste. In one preferred embodiment, the fat is a dairy fat. In another embodiment, the fat is a mixture of non-dairy fat and dairy fat, preferably 10–55% non-dairy fat and 90–45% dairy fat.

19 Claims, No Drawings

DAIRY BASED SPREAD AND PROCESS OF MAKING

The invention relates to a creamy cultured dairy based spread suitable as a table spread for use on bread or crackers, and which spread is prepared from a dairy base, such as cream, milk, and the like, and butter-fat, e.g. such being present in cream, which is then cultured, and heated to stop further acidification.

Products prepared in such a manner have been described in British Patent Specification GB 1 261 910. In this document, spreads are described which are obtained by dispersing skim milk powder in water, adding molten butter, adding a culture cooling and re-pasteurizing. The products have a fat content of about 45%, and have a whey/casein ratio as found in milk (which is about 0.2). The products obtained have a fresh-cheese like texture and taste. No reference to a vegetable fat is made.

In DE 2 300 663, low calorie spreads are described prepared by pasteurizing skimmed milk, pasteurizing, homogenizing and cooling, mixing with lactic acid cultures and structuring agents, and then filling cups or tubes, and cooling it a pH of about 4.8. Such product is even when refrigerated prone to post-souring, and flocculation will occur easily, accompanied by visible whey separation. No reference to a vegetable fat is made.

The present invention aims at water-continuous spreads which are very suitable as butter-replacement for cold uses, such as spreading on bread or toast, as an underlayer.

Accordingly, the present invention regards a creamy, cultured dairy based water continuous spread comprising less than 35% fat, up to 4.5% milk protein, gelatin or a gelatin replacer, optionally up to 2% structuring agent, the spread having a pH value between 4.6 and 5.2, and a Stevens value hardness at 10° C. of 200–500 g and of 50–250 g at 20° C., a whey to casein weight ratio higher than in milk, and the spread having a butter-like mouthfeel, texture and taste. The fat suitably comprises dairy fat in amounts in the range of 100–45%, and vegetable fat in amounts between 0–55 wt %, based on the total weight amount of fat present.

In a more preferred embodiment, the present invention regards a creamy, cultured dairy based water continuous spread comprising less than 35% fat which preferably is composed of 100–45% dairy fat and 0–55 wt % vegetable fat, up to 4.5% milk protein, gelatin, optionally up to 2% structuring agent, the spread having a pH value between 4.6 and 5.2, and a Stevens value hardness at 10° C. of 200–500 g and of 50–250 g at 20° C., a whey to casein weight ratio higher than in milk, and the spread having a butter-like mouthfeel, texture and taste.

Accordingly, the present invention provides a water-continuous, low fat spread having butter like taste and texture characteristics. The presently claimed spread derives its taste from having been cultured, i.e. at least part of the dairy ingredients having been subjected to the influence of acidulating micro-organisms like lactic acid bacteria, cheese starter cultures etc. Unlike fresh cheese, the product of the present invention has a very rich, milky taste with a creamy and butter-like impression, and hence, shows high similarity to butter.

In one particular embodiment, the fat in the low fat spread of the invention comprises 0–55% of a non dairy fat, which preferably is a vegetable fat. Such low fat spread have the unique properties of the fat comprising 10–55% of a non dairy fat, which preferably is a vegetable fat, combined with the spread having butter like taste and texture characteristics. By the spread comprising a fat phase which comprises 10–55% of a non dairy fat which preferably is a vegetable fat, the spread provides the additional health advantages when compared to a product comprising dairy fat only. E.g., in accordance with the invention, the spread can contain a significant amount of its fat in the form of unsaturated fatty acid components, if so desired, without any disadvantage in taste and texture performance when compared to products having dairy fat as the fat component.

In this description and claims the expression "spread" is intended to mean a plastic, spreadable product which can be applied onto bread at room temperature without tearing the bread. The spreads of the present invention have a Stevens value of 200–500 g at 10° C. and 50–250 at room temperature (about 20° C.). The expression "dairy based" refers to products of which at least 40% of the solids are derived from milk. In one embodiment of the invention, the fat used is substantially composed of a dairy fat, and in this embodiment, at least 90% of the solids are derived from milk.

It is an object of the invention to provide a dairy based spread product having a fat content below 35% giving an organoleptic impression of containing considerably more fat and having a consistency comparable to that of conventional butter and butter-like spreads such as margarine. Surprisingly, it was found that butter like products can be obtained which can be used as a replacement for butter which benefit the pleasant characteristics of butter, such as fatty impression, dairy taste, milky taste and aftertaste, still neutral and hence, very suitable for use as an underlayer on bread, toast, and the like, and which has a better spreadability than butter at the colder users temperature range. In comparison to butter, the product of the present invention is spreadable onto bread without tearing it apart at a broad temperature range, i.e. at temperatures varying from refrigerator temperature (about 5° C.) to room temperature (20° C.) and above (30° C.).

It is also an object to provide a mildly, neutral tasting product having a closed keepability of several weeks. In a preferred embodiment, the products of the invention have a closed keepability of 8 week or more, which means that no change of taste and structure occurs on storage for such a period. Fresh cheese based products are available on the market which have pH values below 4.6; these products show an inherent acid impression on eating. Furthermore, the fresh cheese products available have the typical cheese like texture and are more "mousse-like" than the butter-like product presently found, often were found to show syneresis and provide a more sandy impression upon spreading and eating than butter and than the product of the present invention. Furthermore, a more sweet and less sour impression is obtained upon eating the product of the present invention compared to the presently available products. Melting behaviour in the mouth, and mouthfeel of the product of the present invention is clearly different than that of prior art products. None of the products known comprises a combination of vegetable fat and butterfat.

The present product is obtained by fermenting a dairy base with lactic acid type of cultures such as those which are normally used for acidification of milk products. At this stage of fermenting, the vegetable fat can be present, although the vegetable fat can also be added at a later stage. Examples of suitable lactic acid type of cultures are *Streptococcus lactis*, yoghurt cultures such as *Streptococcus thermophilus, Lactobacillus delbrueckii* subspecies *bulgaricus*, and *Lactobacillus helveticus*. In a preferred embodiment of the invention, *Streptococcus thermophilus* and *Lactobacillus bulgaricus* are used. The fermentation is stopped in a suitable manner—such as by heating—at a pH value between 4.0 and 5.2, and preferably at a pH value between 4.6 and 5.2. The cultures used are no longer active in the end product to be obtained. The product of the invention has a pH value between 4.6 and 5.2, preferably between 4.7 and 5.2, and most preferred between 4.8 and 5.0.

The expression "cultured micro organisms" as used in this description and claims is intended not to comprise any microorganisms which not unusually are unintendedly present in dairy products despite hygiene-measures aiming to prevent that. The product of the invention can contain some spore formers which are not destroyed by pasteurization, but cannot grow under the chilled storage conditions used for the presently claimed products.

The product will have a whey protein to casein weight ratio which is higher than that found in milk. It was found that the combination of whey protein concentrate which has been added to the product in addition and in combination with the whey protein present in the dairy ingredients used provides a very good water binding. By adding undenaturated whey protein, and processing such as homogenizing and heating, in combination with the specific pH as now claimed, a product is obtained showing very little or no syneresis and a very specific, butter comparable texture. Preferably, the ratio whey protein to casein in the product preferably ranges between 0.7 and 1.0.

For obtaining the required spreadability and mouthfeel some gelatin will suitably be present. The product comprises at least 0.5 wt % gelatin (based on total weight of the product), and further preferred at least 0.6 wt %. No further beneficial effect was observed for levels above 2%, compared to 2% levels. It was found that if gelatin of a bloom strength of 250, the best products are obtained if 0.8–1.2 wt % gelatin is used, based on fat free material. Preferred is to use 1.1 wt % gelatin. If gelatin of another bloom strength is used, other weight ranges are applied providing an equivalent structuring performance. As these days it is sometimes desired to have no gelatin present in consumer products, a very specific embodiment of this invention allows that instead of gelatin, a so called gelatin replacer is used. Gelatin replacers are components or compositions which have similar mouthfeel behaviour, and similar performance, such as water binding and melting properties compared with gelatin. Examples of suitable gelatin replacers are described in, inter alia, European Patent Application EP 496466 and in EP 474299 and are often very specific or specifically treated components or compositions. Amounts used are in addition to those indicated for the structuring agent below.

The product contains less than 4.5 wt % of milk protein. It was found that if more protein is present, a thick, cheese-like product is obtained. Preferably, the milk protein level ranges between 2 and 4.5 wt %, preferably between 2.3 and 4.2 wt %, and most preferred between 2.7 and 3.9 wt %.

The fat level of the product of the invention is below 35 wt %, preferably 45–100 wt % of the fat present being dairy fat. Preferably the spread comprises less than 30 wt % and particularly less than 28 wt % fat. Suitably, the product will contain more than 15 wt % of fat. Surprisingly, it was found that without the spread comprising dairy fat alone as a fat source, the presence of up to 55 wt % of a non-dairy fat, and in particular a vegetable fat provided a product having the dairy, creamy butter-like impression. In its highly preferred embodiment, the non-dairy fat is a vegetable fat or fat blend having a solids content at different temperatures (N-line) similar to that of butter.

Suitably, 15–50 wt % of the fat is a vegetable fat, and preferably, 20–45 wt % is a vegetable fat. In addition to the butter fat, the fat that can be used can be any known vegetable fat. Preferred fat, however, are: palmkernel oil, soybean oil, rapeseed oil, coconut oil, sunflower oil, safflower oil, or fully or partially hardened fractions thereof. In a further preferred embodiment, the total amount of saturated fatty acid components in the fat is less than 45 wt %, based on the total amount of fatty acid components, and further preferred less than about 30 wt %.

The dairy fat present in the product can suitably be obtained from the dairy source used, such as cream, whole milk, protein enriched milk, concentrated milk, filled milk and mixtures of two or more thereof, the use of cream as at least one fat source being preferred. In one preferred embodiment substantially all fat present is dairy fat.

The dairy source which is used for obtaining the presently claimed products can, in addition to those mentioned above, also be skim milk.

Optionally, up to 1%, and preferably up to 0.5%, based on the total weight of the end product, of a structuring agent not being a protein is present. Examples of such agents are locust bean gum, carboxy methyl cellulose, xanthan, guar gum, alginate or combinations thereof. Other suitable agents not mentioned here can be applied as well. Although higher amounts of such a structuring agent can be applied, the presence in higher amounts will negatively influence the taste and mouthfeel of the product. The spreadability may very suitably be controlled by adding the structuring agent in such amount that the final product will get a Stevens value at 10° C. (method for determination defined in this specification) between 200 and 500 g and in particular between 225 and 400 g.

Optionally, usual additives for spreads such as salt, herbs, spices, flavours, colouring matter, preservatives and the like may be added, although it is believed that for obtaining a suitable underlayer, butter like spread none of these is needed. Normally, for use as a butter like spread at least some salt will be added.

The invention also provides a process for obtaining a product according to the invention, the process comprising the pasteurizing of cream, skim milk, whole milk, concentrated milk, filled milk and mixtures of two or more thereof, additional whey protein and, optionally, structuring agent, cooling down to culturing temperature, inoculating with an acidulating bacteria culture and fermenting until a pH of less than 5.5, preferably less than 5.2 is obtained, controlling the pH value to ≧4.5, preferably to a pH value ≧4.6, and further preferred ≧4.8, optionally adding additional cream, sweet cream, or other dairy product listed above, until a pH value of 4.6 to 5.2 is obtained, homogenizing the resulting product at 50–600 bar, preferably between 75 and 400 bar, and further preferred between 100 and 300 bar while at a temperature above 35° C. until the required structural properties are obtained, the components not listed here, for example such as the gelatin or gelatin replacer, preservatives and the like if so desired being added at any suitable moment in this process.

In the process, acidifying and homogenization can be carried out in any order. It is preferred to homogenize at a temperature above 60° C.

For obtaining an increased closed keepability the spread is filled into containers while at a temperature in excess of 65° C. which containers then are hermetically sealed. By filling at a temperature in excess of 70° C., a still better keepability is obtainable. By this higher temperature, the shelf life of the product in the closed container can be 8 weeks or even more.

The invention will be exemplified in the following examples of some practical embodiments thereof. Percentages used in the description, examples and claims refer to weights, unless expressly indicated otherwise.

The "Stevens" hardness St, expressed in grams, was determined 1 week after manufacturing the product when stored at 5° C. and thereafter equilibrated for 24 hours at the temperature of 9 or 11° C. as indicated, using a 0.5 inch Ø cylinder in a Stevens-LFRA Texture Analyzer (ex Stevens Advanced Weighing Systems, Dunmore, U.K.) load range 1000 g operated "normal" and set at 20 mm penetration depth and 1.0 mm/s penetration rate. In the present document room temperature means 25° C.

For a better understanding of the invention some preferred embodiments thereof will be described. Parts and percentages are by weight unless indicated otherwise.

EXAMPLE 1

90 parts dairy cream standardized to a fat content of 26% are pasteurized at 85° C. for about 10 minutes, such that denaturation of the whey protein occurs, and mixed with a solution of 0.8 parts gelatin, 0.8% parts whey protein concentrate, 70% and 0.3% parts salt, dissolved in 8 parts skimmilk. After cooling down to a suitable temperature for culturing, a common acidulating culture is added, whereafter the fermentation is allowed to proceed until a pH value of about 4.8 is reached. The fermentation is stopped by heating to 80° C. The product so obtained is homogenized at 100 bar, filled in ½ 1 containers, cooled down to below 10° C. and stored at chill temperatures. A smoothly spreadable product is obtained having a Stevens value of 300 to 330 at 10° C.

EXAMPLE 2

The process of Example 1 is repeated with the difference that the fermentations stopped after a pH value of 4.3 is reached. Thereafter circa 20% sweet dairy cream having a fat content of 40% is added, until the pH value is between 4.7 and 4.8.

For flavouring purposes, additives like spices, herbs, nuts, fresh, preserved or dried fruits could be mixed into the spread of the present invention.

EXAMPLE 3

Dairy cream (90 parts by weight) was standardized to a fat content of 30% by the addition of skimmed milk. 1.75 wt % whey protein concentrate (70% protein) and 0.3% locust bean gum were added, whereby, after mixing, the obtained composition was pasteurized at 85° C. for about 10 minutes. The composition was cooled down to culturing temperature, and mixed with a pasteurized solution of 0.7 wt % gelatin, 0.3 wt % kitchen salt, carotene and skim milk, so that the fat content of the mixture obtained was 26%. Then, a first homogenization step was carried out at elevated pressure. To the obtained homogenized composition, a yoghurt culture was added, whereafter the fermentation was allowed to proceed until a pH value of about 4.8 was reached. The fermentation was then stopped by heating to 60° C. The product so obtained was then homogenized once more at elevated pressure, and heated to a temperature of 75° C. for filling into 150 g containers, cooled down to below 10° C. and stored at chill temperature. The hardness was measured according to the procedure described above and found to be 337 g, the pH of the product was 4.83. The dairy protein content was 3.8%, the fat content 26%. The product was then tested for its performance. Test method and results are indicated under "Quantitative Descriptive Analysis test".

For comparison, products were obtained from the supermarket in Germany and compared to the product of the present invention. The products were sold under the names "Rotkäppchen", "Aufs Brot", and "Yella".

Composition analysis were performed and listed below in Table A.

TABLE A

|  | ROTKÄPPCHEN | AUFS BROT | YELLA |
| --- | --- | --- | --- |
| pH | 4.5 | 4.65 | 4.52 |
| fat | 25.2 | 22 | 27.5 |
| dairy protein | 4.05 | 2.8 | 2.4 |
| whey protein/casein | 1.17 | 0.21 | 0.20 |
| hardness | 235 | 135 | 223 |
| gelatin | yes | no | yes |

The viscosity of all products was measured using a Carri-med CSL 500 reometer. The reometer has a cone-plate geometry (diameter of the cone was 4 cm, cone angle was 2°). The viscosity was measured using a shear rate $\gamma$ of 10 $s^{-1}$ and the temperature T being 20° C. Results are indicated in Table B.

| Sample | viscosity ($\gamma$ of 10 $s^{-1}$) |
| --- | --- |
| Ex. 3 (invention) | 55 Pa · s |
| Rotkäppchen | 33 Pa · s |
| Aufs Brot | 23 Pa · s |
| Yella | 22 Pa · s |

Quantitative Descriptive Analysis test

The product obtained at Example 3 and the commercial available products were subjected to a Quantitative Descriptive Analysis test. Hereto, 16 women, screened at several tests for identification of the basis tastes and more or less familiar odours, recognition of odours and tastes, and verbal creativity were selected. The panellists were trained extensively in describing and assessing the sensorial aspects of Dairy based spreads. The attributes were categorised in appearance (16 attributes), spreading behaviour, including the appearance during spreading (12 attributes), odour (8 attributes), mouthfeel (13 attributes), taste (32 attributes), aftertaste (10 attributes), and after-mouthfeel (3 attributes). At the end of the training period, test results showed that the attributes were suitable to distinguish reliably between the products. 16 panellists took part in the experiment.

The spreads were presented two times in balanced test design under normal daylight conditions at a temperature of about 10° C. A score between 0 and 100 was given for each attribute, the total of the scores of all participants was calculated and divided by 16, and so the mean score was obtained. An analysis of variance with product and presentation as factors was performed to see which products were different. Significance was found were p was <0.10.

No products available on the market were found to be offered as butter like spreads. "Aufsbrot" is indicated as product AB, "Rotkäppchen" as RK, and "Yella" as YE.

From testing on spreadability, taste, appearance and aftertaste, it became clear that the product according to the invention had the best similarity to butter. The average score for the mouthfeel impression being described as "fat" scored 47, compared with 20 (AB), 31 (RK) and 32 (YE) of the products on the market. On taste scoring, the taste sensation described as "cream" scored 41, compared to 33 (AB), 31 (RK) and 28 (YE) for the products on the market. An aftertaste impression indicated as "milk" the product of Example 3 scored 44, compared to 33 (AB), 33 (RK) and 31

(YE) for the marketed products, whereas the aftertaste impression indicated as "butter" scored 31 for the product of the invention and 25 (AB), 24 (RK) and 19 (YE) for the marketed products. Thus, the product of Example 3 had on issues most important for butter similarity items scores of 47, 41, 44 and 31, compared to for AB: 20, 33,33 and 25; for RK: 31, 31, 33 and 24; and for YE: 32, 28, 31, and 19. The test clearly showed that the product of the invention had the highest scores on taste attributes such as milk*, cream, butter and sweet and the lowest scores on sourlike attributes like yogurt, buttermilk and lemon, and also on cheese. Furthermore, the product of the invention was significantly less sandy and mousse like than commercial products, and provided the best scores on butter- and margarine-like mouthfeel. The commercial products all scored significantly higher on cheese-like attributes.

*significant differences (p<0.1) found with Aufs Brot and Yella. Scored better than Rotkappchen, but the difference was not significant.

EXAMPLE 4

5 products of different fat composition were prepared and tested by an expert panel. The products were prepared as follows.

To 7.76 kg of a cream composition (30% fat) of which the composition is indicated in Table C, 1.11 kg of a mixture consisting of 175 g of milk protein concentrate (70%), 30 grams of Meyprodan 200 (ex Meyhall), 1 g of carotene (10%), 24 g of water, and 0.9 kg of milk was added. The composition was pasteurized at 85° C. for 10 minutes, and cooled down to 44° C. Thereto, about 0.7 kg of gelatin was added, after which homogenisation at 200 bar took place. To the homogenized composition 0.4 kg of a yoghurt culture was added, whereafter the fermentation was allowed to proceed until a pH of about 4.8 was reached. The fermentation was stopped by heating the mixture to 58° C. The obtained product was homogenized at 300 bar, and subsequently heated to a temperature of 75° C. for filling the small containers. The product was cooled down to below 10° C. and stored at chill temperature.

TABLE C

|  | Ex. 1 | Ex. 2 | Ex. 3 | Ex. 4 | Ex 5 |
| --- | --- | --- | --- | --- | --- |
| cream (40% fat) | 5.2 | 3.25 | 4.55 | 5.2 | 6.5 |
| skimmilk (0% fat) | 2.94 | 4.112 | 3.332 | 2.94 | 2.16 |
| non-dairy fat(ndf) | 0.52 | 1.298 | 0.778 | 0.52 | 0 |
| ndf composition | A | B | B | B | — |
| % ndf on total fat | 20 | 50 | 30 | 20 | 0 |

Fat composition A was a groundnut based liquid table oil. Fat composition B comprised: 27% BO, 8% BO28, 5% PO42, 45% of a blend prepared by interesterification of a composition of 36CN/33PO/22dfPOs/9RP41, and 15% RP. The fat blend had an N10 value of between 28 and 33, an N20 value of at least 13, an N30 value of less than 3.5, and an N35 value of less than 1.

From testing on spreadability, taste, appearance and aftertaste, it became clear that the product according to the invention had a very high similarity to butter. Almost no difference was found between the products of the invention and the product comprising dairy fat as the only fat present in the product.

We claim:

1. Creamy, cultured dairy based water continuous spread comprising solids of which 40% are derived from milk, and comprising less than 35% fat, up to 4.5% milk protein, gelatin or a gelatin replacer, optionally up to 2% structuring agent, the spread having a pH value between 4.6 and 5.2, and a Stevens value hardness at 10° C. of 200–500 g and of 50–250 g at 20° C., a whey protein to casein weight ratio of more than 0.2, and the spread having a butter-like mouthfeel, texture and taste.

2. Spread according to claim 1, wherein gelatin is present.

3. Spread according to claim 2, wherein at least 0.5 wt % gelatin is present.

4. Spread according to claim 1, wherein the fat used is substantially composed of dairy fat.

5. Spread according to claim 1, wherein the fat used comprises 0–55% of a non-dairy fat, which preferably is a vegetable fat.

6. Spread according to claim 1, wherein the spread has a pH value of at least 4.7.

7. Spread according to claim 1, wherein the spread comprises up to 0.8 to 1.2% by weight of gelatin of a bloom strength of 250.

8. Spread according to claim 1, wherein the spread comprises 2.3 to 4.2 wt % milk proteins.

9. Spread according to claim 1, wherein the ratio of whey protein to casein ranges between 0.7 and 1.0.

10. Spread according to claim 1, wherein the fat used comprises 0–55% of a vegetable fat.

11. Spread according to claim 1, wherein the spread has a pH value of between 4.8 and 5.0.

12. A process for obtaining a product according to claim 1, comprising any one selected from the group consisting of pasteurizing of cream, skim milk, whole milk, concentrated milk, filled milk and mixtures of two or more thereof, additional whey protein and, optionally, structuring agent, cooling down to culturing temperature, inoculating with an acidulating bacteria culture and fermenting until a pH of less than 5.5, preferably less than 5.2 is obtained, controlling the pH value to $\geq 4.5$, and further preferred $\geq 4.8$, optionally adding additional cream, sweet cream, or other dairy product listed above, until a pH value of 4.6 to 5.2 is obtained, homogenizing the resulting product at 50–600 bar, while at a temperature above 35° C. until the required structural properties are obtained.

13. A process according to claim 12 wherein a homogenization step is carried out prior to adding a culturing agent.

14. A process according to claim 12, wherein the spread is filled into containers while at a temperature in excess of 65° C. which containers then are hermetically sealed.

15. Process according to claim 12, wherein in step (d) fermenting is continued until a pH of less than 5.2 is obtained.

16. Process according to claim 12, wherein in step (d) the pH is controlled to $\geq 4.6$.

17. Process according to claim 12, wherein in step (d) the pH is controlled to $\geq 4.8$.

18. Process according to claim 12, wherein in step (g) homogenizing is carried out at 75–400 bar.

19. Process according to claim 12, wherein in step (g) homogenizing is carried out at 100–300 bar.

* * * * *